United States Patent

Watson, Jr.

[11] 3,950,687

[45] Apr. 13, 1976

[54] SERVO-MECHANISM FOR CONTROLLING VELOCITY AND POSITION OF A CONTROLLED MEMBER

[75] Inventor: James F. Watson, Jr., Hampton, Va.

[73] Assignee: Newport News Shipbuilding & Drydock Co, Newport News, Va.

[22] Filed: Apr. 12, 1974

[21] Appl. No.: 460,625

[52] U.S. Cl. ............... 318/588; 318/635; 91/363 A
[51] Int. Cl.² .................... F15B 9/03; G05B 11/36
[58] Field of Search.................... 318/635, 609, 610; 91/363 A, 363 R, 362, 361

[56] References Cited
UNITED STATES PATENTS

| | | | |
|---|---|---|---|
| 3,160,880 | 12/1964 | Aires................................. | 318/635 X |
| 3,201,675 | 8/1965 | Curran et al..................... | 318/635 X |
| 3,428,149 | 2/1969 | Burch .............................. | 318/610 X |
| 3,510,737 | 5/1970 | Brown et al. .................... | 318/635 X |
| 3,701,992 | 10/1972 | Allen ................................ | 318/635 X |
| 3,735,230 | 5/1973 | Gerighausen et al. .......... | 318/609 X |
| 3,748,565 | 7/1973 | Wilson et al....................... | 318/609 |
| 3,819,999 | 6/1974 | Platt................................ | 318/610 X |

Primary Examiner—Robert K. Schaefer
Assistant Examiner—John N. Redman
Attorney, Agent, or Firm—Pollock, Vande Sande & Priddy

[57] ABSTRACT

A servo-system for controlling position as well as rate of movement of a controlled device. Any command signals are processed or shaped prior to comparison with the feedback position signals. This processing includes integration at one of two available integration rates in accordance with the magnitude of the difference between the command and shaped command signals to correct for synchro non-linearities. The processing also includes limiting the input to the integrator such that the velocity as well as position of the controlled member is controlled.

A fail-detect system monitors critical signals and power levels and distinctively indicates a failure if any is detected.

6 Claims, 5 Drawing Figures

Processed Signal Command

Servo-Translator Amplifier

Fail Detect System

SERVO-MECHANISM FOR CONTROLLING VELOCITY AND POSITION OF A CONTROLLED MEMBER

FIELD OF THE INVENTION

This invention pertains to the field of servo-mechanisms for controlling the velocity as well as the position of a controlled member. In particular, the servo-mechanism is employed as a vehicle component to control the position and velocity of vehicle control surfaces. In one embodiment, the vehicle may be a ship and the controlled surface can be a rudder, for example.

BACKGROUND OF THE INVENTION

Servo-mechanisms for controlling the position of vehicle control surfaces are not novel. However, the prior art has come to recognize a number of problems in the available systems.

For purposes of discussing the problems, one can consider the rudder of a vessel as a controlled surface. In some senses, of course, the rudder of a vessel is also a vessel control surface since it controls the heading of the vessel. In this application the word control surface or controlled surface may be used interchangeably depending upon the context. The vehicle operator can, by manipulating the helm, call for changes in the rudder position. Conventionally, the servo-system includes an electronic portion which compares an electrical signal representative of the position of the helm with another electrical signal representative of the actual rudder position and develops an error signal to control the rudder position. Furthermore, the error signal may then be used to control a valve in a hydraulic system which actually moves the rudder in response to the developed error signal. It is not uncommon, in these systems, for the position error signal to be so large as to open completely the valve so that other elements of the hydraulic system actually limit the rate of movement of the rudder. Since this hydraulic system conventionally supplies hydraulic power for a variety of other vehicle systems the condition of the hydraulic system is not constant. As a result, the rate of rudder movement may vary in accordance with the condition of the hydraulic system. This is clearly an undesirable condition and the specifications of many vehicle control systems include the specification of rate of movement of the controlled member. Clearly, prior art systems such as that outlined above are inadequate to meet the specification of controlled member velocity.

Furthermore the signals representative of helm and control surface position are generated by transducers which convert mechanical position to electrical signals. Non-linearities in the transducer characteristics will obviously affect operation of the system. Although matched non-linearities in transducers will negate each other under static conditions, such non-linearities in dynamic operation will also affect the control surface velocity. Thus, to meet control surface velocity specifications it may become necessary to provide apparatus to compensate for the dynamic non-linear effects.

In particular synchros are common servo-system transducers. Since synchro signal generation is proportional to the change in sine the synchros non-linearities occur at large ($>30°$) angular displacement.

Additionally it is desirable to provide failure sensitive devices in the servo-system. This is especially important in large vehicles such as large ships or planes. Clearly, the size of these vehicles multiplies the consequences of accidents. Furthermore although an operator could be relied on to detect failures, the inertia and necessary actuating forces associated with control surfaces magnify the effects of delay in sensing control system failures. For this reason electronic devices are indicated to monitor system operation and take appropriate action in case of system malfunction.

SUMMARY OF THE PRESENT INVENTION

In order to overcome the difficulties mentioned above the present invention processes the command signal such that an instantaneous large position error is not used to control the servo-valve. Instead, a new signal is generated such that when algebraically subtracted from the feedback position signal the difference signal is used to control the servo-valve and this difference signal is always within the proportional range of the servo-valve during normal movement of the controlled member. In order to effect this, the command signal is processed in order to duplicate the movement of the controlled member when moving within desired rates. The precessed command signal becomes the instantaneous time position of the controlled member moving between its present position and the commanded position.

Synthesis of the command signal or processing of the command signal includes an integration step with the output of the integrator (the processed command signal) being compared with the feedback position signal of the controlled element to generate the actuation signal for operation of a servo-valve. The actual command signal is compared with integrator output and the difference between these signals, which will be termed a command error signal, is limited to a predetermined value. The limited command error signal forms the input to the integrator. Since the integrator input can never exceed this predetermined value the rate of change of the integrator output can be directly controlled by controlling the time constant of the integration network. The time constant of the integration network is selectable in dependance upon the magnitude of the output of the integrator. The integrator time constant is controlled by a pair of resistors connected in parallel. One of the resistors is selectively switched out of the circuit by a voltage controlled gate. Switching this resistor out of the circuit of course raises the equivalent resistance in the integrator circuit and decreases the time constant. The gate is controlled by the magnitude of the output voltage of the integrator. The integrator output voltage is compared with a predetermined reference in order to control the condition of the gate.

The present invention also provides a novel fail-detect system which monitors significant signal, power and signal rate levels to determine if the system is operating correctly.

The fail-detect system monitors the servo-valve actuation signal. This signal, during normal operation, is maintained below a predetermined level. By comparing the servo-valve actuation signal with the predetermined level, the system determines a failure when the error signal increases above this level. A time delay is inserted so that transients do not trip the fail-detect system.

As a further failure-detection arrangement two reduntant systems shape the command signal and provide two servo-valve actuation signals. These servo-valve actuation signals are compared, one with the other, and the fail-detect system is triggered if the difference exceeds a predetermined minimum. A delay is also used in this channel for minimizing transient effects on the fail-detect system.

Furthermore, a significant power level in the entire system is the synchro-excitation power. If this level is too low, the system will not generate the necessary command and position signals on which to operate. Thus, the operation of the other fail-detect systems could be inhibited by the servo-system not receiving proper position signals. Therefore, the synchro-excitation voltage is compared with a preset standard and the fail-detect system is triggered if the synchro-excitation voltage decreases below this reference. An additional time delay is utilized in this channel for similar reasons.

BRIEF DESCRIPTION OF THE DRAWINGS

In the following description, reference will be made to the following drawings as an aid in describing the invention and the preferred embodiment thereof; in the drawings.

DETAILED DESCRIPTION OF THE DIAGRAM

Figure 1:
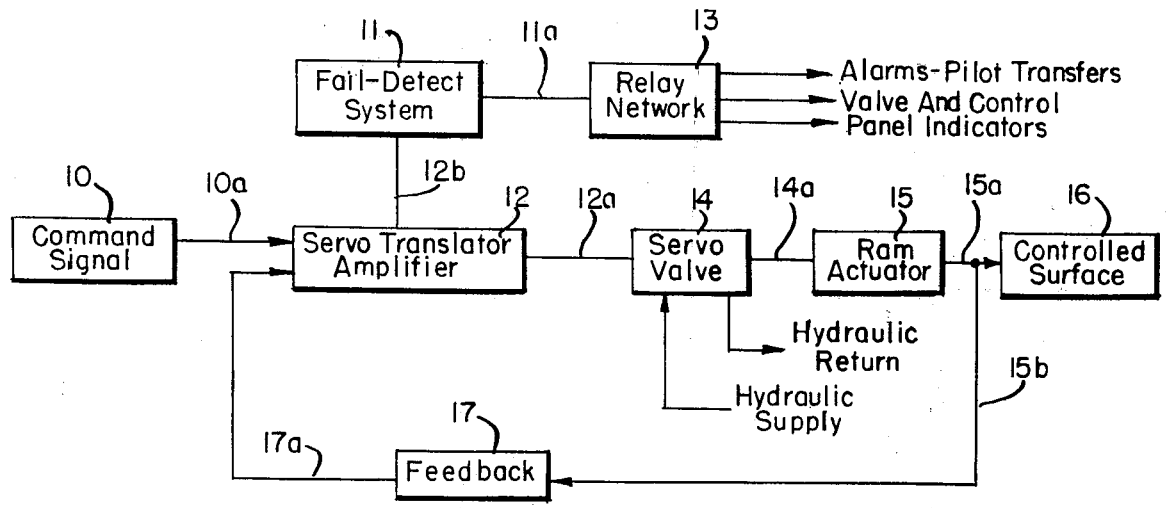
FIG. 1 is a block diagram illustrating a complete control system including the present invention.

FIG. 1 is a block diagram illustrating a typical control system which may be located on board a vehicle to control one of the vehicle control surfaces. A commond signal generator 10 provides a command signal to the servo-translator amplifier 12 over connecting cable 10a. The second input to the servo-translator amplifier 12 is provided by feedback unit 17 over cable 17a. The servo-translator amplifier first processes the command signal in accordance with the teachings of the present invention to produce a processed command signal which is then compared with the feedback signal provided over cable 17a. The difference between these two signals is the actuation signal which is communicated to servo-valve 14 over line 12a. At the same time, servo-translator amplifier 12 is connected to the fail detect system 11 via cable 12b. Although cable 12b is represented, in FIG. 1, by a single line, those of ordinary skill in the art will understand that is actually comprises a number of conductors as will be more fully described hereinafter. The fail detect system 11 monitors various signal and power levels and, in case of a failure, provides a signal to the relay network 13 over cable 11a. The relay network 13 may be connected to alarms, control panel indicators and to a pilot transfer valve which may be connected so as to energize a completely hydraulic control circuit or, alternatively, allow manual control.

Insofar as the present discussion has preceded each of the units communicates with the following unit by means of electrical signals. However, the servo-valve 14 communicates with the ram/actuator 15 over hydraulic line 14a. In response to positioning of the servo-valve 14 the ram/actuator 15 produces mechanical movement. Ram/actuator 15 is mechanically coupled to the "controlled" surface 16 by coupling 15a. In order to provide the control system with a measure of the extent of movement of the control surface 16 the ram/actuator 15 is coupled to a feedback unit 17 by another mechanical coupling 15b. The feedback unit 17, in addition to a linkage and gear ratio also contains a transducer to translate the mechanical movement into an electrical signal. This electrical signal, which is representative of the position of the control surface 16 is provided to servo-translator amplifier 12 over cable 17a.

In view of the foregoing those with ordinary skill in the art will perceive the manner in which this control system operates. The electrical signals, representative of a desired or command position are provided to the servo-translator amplifier 12 from the command signal generator 10. Assuming the system had been in the steady state, this would produce an actuation signal coupled over line 12a to the servo-valve 14. Movement of the servo-valve 14 would result in movement of the control surface 16. This movement would vary the signal provided servo-translator amplifier 12 from the feedback path 17a. When the command signal and the feedback signal agree then the system would again revert to a static condition.

The present invention more particularly concerns the servo-translator amplifier 12 and the fail detect system 11 and these will be explained in more detail with reference to FIGS. 2, 3, and 4.

Figure 2:
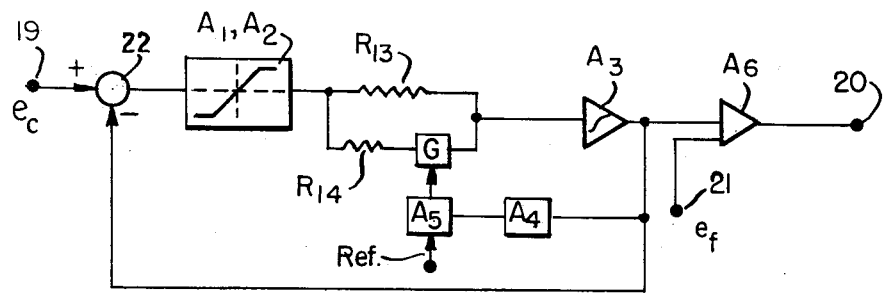
FIG. 2 is a block diagram illustrating the principles of the present invention.

In order to achieve the objects of the present invention the servo-translator amplifier 12 takes the form shown in FIG. 2. FIG. 2 is a representation of the actual servo-translator amplifier 12, simplified for purposes of explanation. As has been mentioned above one of the objects of the present invention is to maintain the servo-valve in a proportional band, that is where a change in input produces a proportional change in output. To effect this, of course, it is necessary that the servo-valve never become fully opened during normal operation. In order to accomplish the foregoing the servo-translator amplifier synthesizes a command signal that duplicates the desired displacement versus time response of the control surface. Furthermore, in order to meet the specifications concerning the velocity of the controlled member the command signal changes at a predetermined rate. Thus, the command signal becomes the instantaneous time position of the mechanical load or vehicle control surface moving between its present position and the command position.

In FIG. 2, the command signal is provided at terminal 19, the feedback signal is provided at terminal 21 and the valve actuating signal is available at terminal 20. As shown in FIG. 2, the command signal is provided to a summing device 22 which is also provided with an output signal from the integrating amplifier A3. The difference between the command signal ($E_C$) and the integrator output is provided by the summing device to limiting amplifiers A1, A2. As shown in FIG. 2, the limiting amplifiers A1, A2 provide an output proportional to their input between predetermined limits. Beyond these limits the amplifiers provide a constant output. The signal is limited at an appropriate level so that regardless of the difference between command signal and feedback signal the input to integrating amplifier A3 will be equal to or less than a predetermined maximum value. As a result the servo-valve actuating signal will maintain the servo value in its proportional band. The output of the amplifiers A1, A2 is fed to parallel resistors R13 and R14. A gate G, in series with R14, is capable of opening circuiting R14 such that the effective resistance R13 or R13 in parallel with R14 controls the time constant of the integrating amplifier A3. The reason for this will be explained later. The integrator output is provided as one input to amplifier A6, as an input to the summimg device 22 and as an input to amplifier A4.

Amplifier A4 is an absolute value circuit which provides to amplifier A5 a positive signal whose magnitude is equal to the output of integrating amplifier A3. Amplifier A5 compares this with the reference connected thereto. If the absolute value of the integrator output (available at the output of amplifier A4) is greater than the reference voltage the gate G is opened, and, if the absoluute value of the integrator output is less than the reference voltage then the gate G is closed.

The output of the integrator, which is also provided to amplifier A6, comprises the processed command signal. Amplifier A6 compares this with the feedback signal ($E_F$) and the difference therebetween, available at terminal 20, operates the servo-valve.

When the system is in a static condition, the position of the control surface is the commanded position which is represented by the command signal voltage. In this condition, the output of the integrator A3 is equal to the feedback voltage. As a result, a zero signal is provided the servo-valve which is thus stationary. Furthermore, since the integrator output voltage is equal to the command voltage the output of the summing device 22 is zero and thus the integrator output is constant. Under these conditions, if a new command position is desired the command signal $E_C$ changes from the static condition mentioned above. As a result, the integrator input is now non-zero. As a result the integrator output begins changing and, as a result, amplifier A6 produces a servo-valve actuation signal at terminal 20. However, the limiter amplifiers A1, A2 limit the integrator input signal to the extent that the output of amplifier A6 does not drive the servo-valve outside of its proportional band under normal operating conditions. As the output of integrator A3 increases the output of the summing device 22 will correspondingly decrease. So long, however, as the output of the summing device exceeds the limiting voltage of the amplifiers A1, A2, the input to the integrator A3 remains unchanging. In this fashion the servo-valve is maintained within its proportional band.

Another of the objects of the present invention is to compensate for the non-linearities in the control system transducers. Under static conditions the integrator output is a representation of the position of the controlled surface. As a result, the integrator output is a measure of where, on the transducer characteristic, the transducer is operating. Under dynamic conditions, the integrator output is not a strict measure of the position of the control surface but it is related thereto. Thus, the system makes use of this feature in modifying the integrator characteristics in accordance with the integrator output to compensate for non-linearities in the position transducers. To effect this, amplifiers A4, A5 and the gate G are utilized. In the embodiment disclosed the integrator A3 is provided with two different time constants depending upon the condition of gate G. Those skilled in the art will understand, however, that if desired, still other integrator time constants could be provided by duplicating the apparatus disclosed herein.

Using the present embodiment as an example, the integrator A3 has two different time constants depending upon the condition of the gate G. One time constant is related to RC (C being constant) and R being equal to the parallel combination of R13 and R14. The other time constant is R13C (R14 being removed from the circuit by the gate G). In order to change from one time constant to the other the gate G is either opened or closed by the comparator amplifier A5.

Those with ordinary skill in the art understand that the output of the integrator A3 can either be positive or negative. To handle these conditions absolute value circuit A4 is provided. The output of A4 is equal to the absolute value of the input. In order to select which of the time constants should be used comparator A5 compares the absolute value of the output of integrator of $A_3$ with a reference. If the absolute value of the output of amplifier A3 is less than the reference the gate G is closed, and, on the other hand, if the absolute value of the integrator output exceeds the reference then the gate G is opened.

Figure 5:
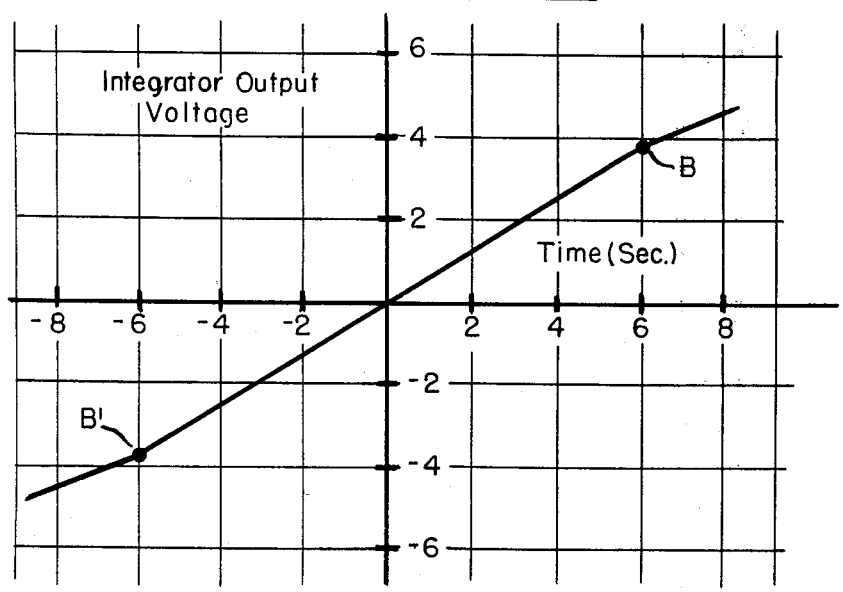
FIG. 5 is a plot of desired shaped command signal as a function of time.

FIG. 5 illustrates the integrator output showing the effect of the changed time constant. In particular, it will be seen that between the points B—B' the integrator output changes at a constant rate. At integrator output voltage less than B', and greater than B, the rate of change of integrator output voltage is less than the rate of change in the interval B—B'. This change in the rate of change comes about directly by operation of the gate G (FIG. 4).

Figure 3:
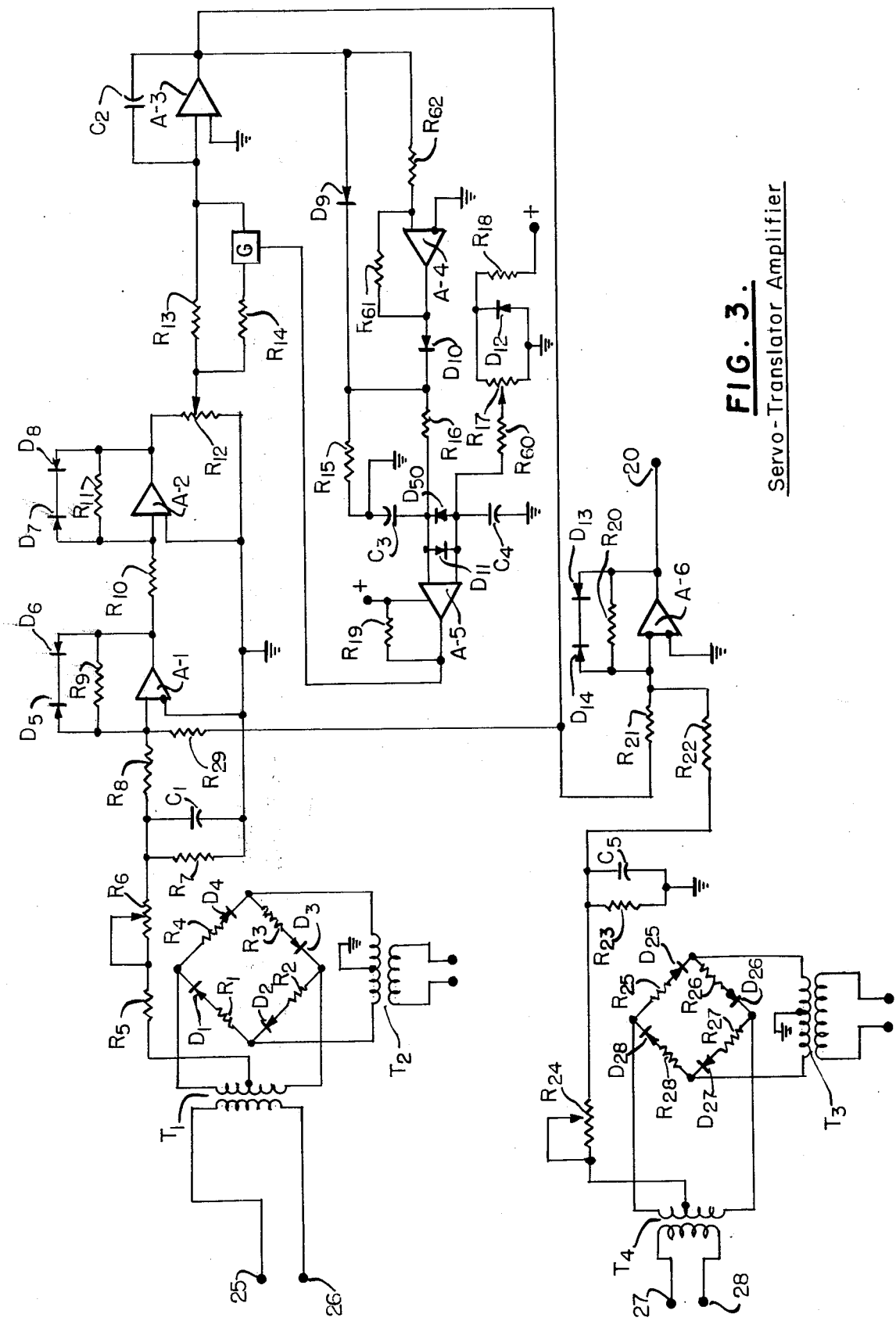
FIG. 3 is a schematic diagram of the servo-translator amplifier.

In order to illustrate the manner in which the apparatus of FIG. 2 is realized reference is made to FIG. 3 which is a schematic diagram of an embodiment of the invention. Before discussing FIG. 3 in detail it will be helpful to realize that the position transducers are synchros and that the position information is amplitude modulated on a carrier. Furthermore, the sense of the position displacement is determined by the phase relationship between the transducer voltage to the power source. It should be understood that the present invention can be used with position transducers other than synchros in which case the demodulating apparatus, shown in FIG. 3 would not be necessary or, other demodulating apparatus might be required.

In FIG. 3 the command signal is available at terminals 25 and 26 and the feedback signal is available at terminals 27 and 28. The output of the servo-translator amplifier is available at terminal 20.

The command signal is coupled to one winding of a transformer T1 whose other winding is connected across a bridge with four legs each leg comprising a resistor and a diode. A second transformer T2 has a power source voltage applied to one winding and the second winding is connected across the same bridge, at opposite terminals. The second winding of transformer T2 has its center tap grounded. The second winding of transformer T1 has its center tap connected to R5, R6 to the junction of R7 and C1. The voltage available at the center tap of the second winding of transformer T1 is a direct current whose magnitude is proportional to the command signal and whose polarity indicates the sense of the deviation from zero.

The limiting amplifiers A1 and A2 each have a pair of Zener diodes (D5,D6-D7,D8) connected cathode to cathode with one anode connected to the amplifier input and the other anode connected to the amplifier output. The pair of amplifiers provides for a non-inverting amplifier-limiter combination. The extent to which the limiting action takes place is determined by the diode characteristics. Those skilled in the art will understand that selection of the limited signal must necessarily take into account the gain between the limiter output and the input to the amplifier which compares shaped command signal and feedback signal. The junction of R7 and C1 is connected to an input of amplifier of A1 through resistor R8. Also connected to one input of amplifier A1 is the output of the integrating amplifier A3, through resistor R29. The resistors R8 and R29 perform the summing function illustrated in FIG. 2 by summing device 22.

A potentiometer R12 is connected across the output of A2. The tap of R12 is connected in parallel to R13 and R14. The other terminal of R13 is connected as one input of integrating amplifier A3 and gate G connects the other terminal of R14 to the input of amplifier A3.

One output of integrator A3 is connectedd to the absolute value network A4. In particular, this comprises a diode D9 connected in parallel with the series combination of amplifier A4 and diode D10. Positive going outputs of amplifier A3 will be coupled through diode D9. Negative going outputs of amplifier of A3 will be coupled through amplifier A4 where they are inverted and coupled through diode D10. Therefore, the output available at the cathodes of diodes D9 and D10 will be a positive signal. Since the resistors (R61, R62) associated with amplifier A4 are equal, the gain of the amplifier is unity and the signal available at the cathodes of diodes D9 and D10 will be equal to the absolute value of the integrator output.

The combination of R18, R17 and D12 connected to a positive source of potential provides a reference voltage generator. The tap of R17 is connected as one input to amplifier A5 through a resistor R60. The other input to amplifier A5 is provided from the absolute value network through a resistor R16. Diodes D50 and D11, connected across the inputs to ampifier A5 limit the difference in input signal to the amplifier A5. As is well known to those skilled in the art, operational amplifiers such as those used herein, become saturated in response to large differences in input signals. Even after the input signals have dissipated, the amplifier itself takes a long period to settle down subsequent to such saturation. To avoid this, the diodes D10 and D11 limit the difference in input signals and thus minimize the saturation problem. Depending upon the relative magnitude of the voltage provided at R17 compared to the voltage provided from the absolute value network, the output of amplifier A5 will either be positive or negative. If the voltage provided by the absolute value network is larger than the reference voltage, the gate G will be open whereas if the output of the integrator is less than the reference voltage the gate G will be closed. As has been explained with reference to FIG. 2, the gate G directly controls which of the two available time constants is applicable to the integrator A3. The output of the integrator A3 is also provided, through R21 as one input to the amplifier A6.

The feedback voltage available at terminals 27–28 is representative of the position of the vehicle control surface. This voltage is provided to one winding of a transformer T4. The other winding of transformer T4 is connected across a demodulating bridge with four legs, each comprising a resistor and a diode. A second transformer T3 has one winding supplied by a power source, the same as that coupled to transformer T2. The second winding of transformer T3 is connected across the same bridge at opposite terminals. The center tap of the second winding of transformer T3 is grounded. The center tap of the second winding of transformer T4 is connected, through variable resistor R24 and R22 to one input of amplifier A6. A low pass filter comprising resistor R23 and capacitor C5 is connected between the junction of R24 and R22, to ground. The demodulated synchro voltage is available at the center tap of the second winding of transformer T4. In order to enable amplifier A6 to produce the difference between the shaped command signal (provided by the integrator A3) and the feedback signal, the relative sense of transformers T1 and T2 is different from the relative sense of transformers T3 and T4. That is, an excursion of the command signal in one direction will produce, at transformer T1 a signal opposite in polarity to the signal produced at transformer T4 when the vehicle control surface moves in the same direction. In this manner when the control surface has moved to the commanded position the input to amplifier A6 will be zero and thus will provide no actuation signal to the servo-valve.

The manner in which the apparatus of FIG. 3 operates should be clear from the discussion with respect to FIG. 2. The reference characters A1 through A6 and G correspond to the identical apparatus in the schematic showing of FIG. 3.

Figure 4:
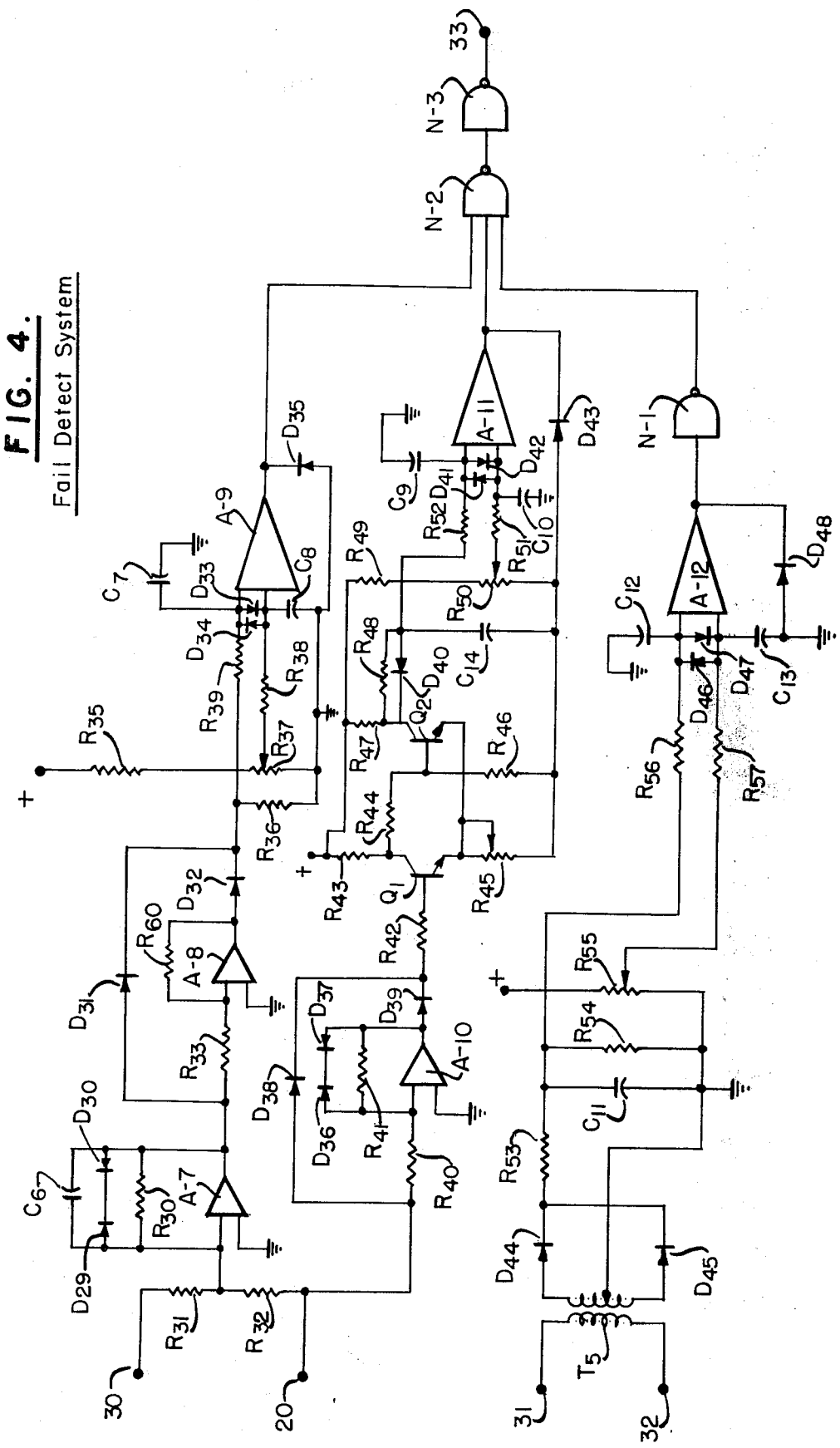
FIG. 4 is a schematic diagram of the fail detect system.

FIG. 4 illustrates the fail system. This receives input at terminals 20, 30, 31 and 32 and provides a fail detect signal at terminal 33. The signal provided to terminal 20 is the signal produced by amplifier A6 (FIG. 3). In order to check on the operation of the servo-translator amplifier, a redundant servo-translator amplifier in provided (not shown), completely separate from that shown in FIG. 3, although identical thereto with the exception that the sign of the command and feedback signals is reversed. The output of that servo-translator amplifier is provided to terminal 30 and is identical in magnitude but opposite in sign to the signal at terminal 20, so long as the two servo-translator amplifiers are operating in identical fashion.

One channel of the fail detect system compares the signal at terminal 30 with the signal at terminal 20. Of course, with the proper operation, these two signals should be of opposite sign but of equal magnitude. A second channel of the fail detect system monitors the magnitude of the servo actuation signal provided at terminal 20. Finally, a third channel of the fail detect system monitors the magnitudde of the synchro-excitation voltages.

The first channel of the fail detect system, referred to above, consists of amplifiers A7, A8 and A9, with their associated components and provides one input to NAND gate N2. The normally equal but opposite servo-valve actuation signals provided on terminals 30 and 20 are connected to amplifier A7, the output of which is limited by the series combinations of diodes D29, D30, connected cathode to cathode. Under proper operation conditions the output of amplifier A7 should be at or near zero. Amplifier A8 and associated components comprise an absolute value circuit, the output of which is the absolute value of hhe output of amplifier A7. The output of amplifier A8 is provided as one input, through R39, to amplifier A9. A second input to amplifier A9 is a reference voltage provided through the voltage divider comprising resistors R35, R38 and potentiometer R37. Manipulation of the tap of resistor R37 changes the threshold of this comparator. When the voltage at the cathode of D32 increases capacitor CC7 begins to charge. When this capacitor voltage rises above the voltage at the tap of potentiometer R37 the output of amplifier A9 drops to zero. Thus R39-C7 provides a time delay to ensure that transients do not trigger the fail detect system.

The second channel of the fail detect system comprises amplifiers A10 and A11 and a Schmitt trigger circuit comprising Q1 and Q2. The voltage connected to this channel is the servo actuation signal. Amplifier A10 comprises an absolute value network which provides, at the cathodes of D38 and D39, the absolute value of the servo-valve actuating signal. Under proper operating conditions the servo valve actuating signal will be such as to maintain the servo-value in its proportional band. If the actuating signal increases beyond this level such as, for instance, to completely open the valve, the system detects a failure in the following manner. Under normal operation conditions Q1 will be cut off and Q2 will be on. If the actuating signal provided at the base of Q1 exceeds a threshold, which is adjustable via R45, the Schmitt Trigger will change state and begin charging C14 through R48. When the voltage across C14 exceeds the voltage provided by potentiometer R50 the comparator A11 changes state indicating a failure condition. However, if, prior to the expiration of the adjustable time delay, the failure corrects itself Q2 will again turn on and allow capacitor C14 to discharge through D40. Thus, by varying R50 the time delay before signaling a failure is adjustable. Under a no failure condition the output of amplifier A11 is high and it drops to near zero when a failure is detected.

As has been explained above, a third channel in the fail detect system monitor the level of synchro-excitation voltages. The entire control system depends upon a specific synchro-excitation level for proper operation. The synchro-excitation voltage is applied, at terminals 31–32 through one winding of transformer T5. The second winding of transformer T5 has its terminals connected to the anodes of diodes D44 and D45. The center tap of the second winding of transformer T5 is grounded. The cathodes of the diodes D44 and D45 are connected together and provided as an input to its filter comprising C11 and R54. The output of the filter is provided to comparator amplifier A12 through R56. A reference voltage is provided by potentiometer R55, and the voltage at its tap is provided, through R57 to the second input of comparator A12. The reference voltage is adjusted so that it is less than the signal provided resistor R56 when the synchros are properly excited. As a result, under normal operating conditions the output of amplifier A12 is low. When inverted by NAND gate N1 a high input is provided to NAND gate N2. The filter provides a time delay previously referred to.

Thus, under proper operation conditions NAND gate N2 receives three high inputs and, after inversion by gates N2 and N3 a high output is provided at terminal 33. If any of the aforementioned conditions change, a low output is provided by terminal 33 to signal a failure condition.

From the foregoing it should be apparent that the described invention provides a servo system in which a servo valve operates only within it proportional band during normal operations. A change in command signal causes the integrator output (a shaped command signal) to change at a prescribed rate so that the controlled member can follow the shaped command signal. As a result the servo valve actuation signal maintains the servo valve in its proportional band.

The integration rate is variable to compensate for non-linear transducer characteristics.

Finally a fail-detect system is provided to monitor the system operation and to signal failures in the transducer excitation or command signal processor.

What I claim is:

1. A servo system including a command signal processor for ensuring controlled rate of movement of a member controlled by said servo system, said command signal processor comprising, means for receiving a command signal, limiting means, integrating means with an input and an output, said input connected to said limiting means, said integrating means having a time constant selectable from a group of at least two different non-zero values and including time constant selecting means connected to said integrater output for selecting said integrater time constant in accordance with the magnitude of said integrater output signal, and summing means, connected to said means for receiving, to said integrater output and to said limiting means for providing, to said limiting means a signal proportional to the difference between said command signal and said integrater output signal, whereby said integrater output signal comprises a shaped command signal which is compared with a signal representative of the actual position of said member to produce an actuation signal to control the rate of movement of said member.

2. The apparatus of claim 1 which includes, amplifier means having at least two inputs and one output, one of said inputs receiving a feedback position signal representative of said member position, and another of said inputs connected to said integrator output, whereby said amplifier means produces a servo valve actuation signal to control said member in position and velocity.

3. The apparatus of claim 2 in which integrator input comprises a parallel combination of resistors and a gate, one of said resistors connected to said integrator through said gate, and said time constant selection means is connected to said gate.

4. The apparatus of claim 3 in which said time constant selection means comprises an amplifier and comparator connecting said integrator output to said gate.

5. The apparatus of claim 4 in which said amplifier produces a signal equal to the absolute value of said integrator output signal, and said comparator has a reference voltage connected thereto, said comparator controlling said gate to vary said integrator time constant in accordance with the relative magnitudes of said reference voltage and said absolute value of said integrator output signal.

6. The apparatus of claim 2 in which said limiting means is arranged to limit said integrator input so that said servo valve actuation signal operates a servo valve connected to said amplifier means within a proportional band.

* * * * *